US010416985B2

United States Patent
Madrid et al.

(10) Patent No.: US 10,416,985 B2
(45) Date of Patent: Sep. 17, 2019

(54) METHOD AND APPARATUS FOR MULTI CYCLE VEHICLE SOFTWARE UPDATE COMPLIANCE HANDLING

(71) Applicant: FORD GLOBAL TECHNOLOGIES, LLC, Dearborn, MI (US)

(72) Inventors: Daniel Joseph Madrid, Livonia, MI (US); Sangeetha Sangameswaran, Canton, MI (US); Jason Michael Miller, Woodhaven, MI (US); John William Schmotzer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/434,457

(22) Filed: Feb. 16, 2017

(65) Prior Publication Data
US 2018/0232223 A1  Aug. 16, 2018

(51) Int. Cl.
| | |
|---|---|
| *G06F 8/65* | (2018.01) |
| *H04L 29/08* | (2006.01) |
| *G06F 8/71* | (2018.01) |
| *G06F 16/951* | (2019.01) |

(52) U.S. Cl.
CPC ............... *G06F 8/65* (2013.01); *G06F 8/71* (2013.01); *G06F 16/951* (2019.01); *H04L 67/34* (2013.01); H04L 67/12 (2013.01)

(58) Field of Classification Search
CPC ..... G06F 8/60; G06F 8/61; G06F 8/65; G06F 8/654; G06F 8/656; G06F 8/658; G06F 8/66; G06F 17/30864; H04L 67/34

USPC .................................................. 717/168–178
See application file for complete search history.

(56) References Cited

U.S. PATENT DOCUMENTS

| | | | |
|---|---|---|---|
| 6,282,709 B1 * | 8/2001 | Reha ..................... | G06F 8/65 717/175 |
| 7,017,040 B2 | 3/2006 | Singer et al. | |
| 9,015,837 B1 | 4/2015 | De Los Reyes et al. | |
| 9,443,358 B2 * | 9/2016 | Breed ..................... | G07C 5/008 |
| 2010/0228404 A1 * | 9/2010 | Link, II .................. | G06F 9/44542 701/1 |
| 2012/0124571 A1 * | 5/2012 | Nagai ..................... | G06F 8/61 717/173 |
| 2013/0318357 A1 | 11/2013 | Abraham et al. | |
| 2014/0006555 A1 * | 1/2014 | Shields ................... | H04L 67/12 709/217 |

(Continued)

OTHER PUBLICATIONS

M. Broy, I. H. Kruger, A. Pretschner and C. Salzmann, "Engineering Automotive Software," in Proceedings of the IEEE, vol. 95, No. 2, pp. 356-373, Feb. 2007. (Year: 2007).*

(Continued)

*Primary Examiner* — Andrew M. Lyons
(74) *Attorney, Agent, or Firm* — Frank Lollo; Brooks Kushman P.C.

(57) ABSTRACT

A system includes a processor configured to query one or more vehicle electronic control unit (ECU) modules to determine current software versions installed on the ECU modules, responsive to a multi-cycle update process resuming. The processor is also configured to pause the update process, responsive to the query identifying a change in at least one software version to a different version from when the update process first began. The processor is additionally configured to report the change to a remote source.

12 Claims, 4 Drawing Sheets

(56) References Cited

U.S. PATENT DOCUMENTS

| | | | | |
|---|---|---|---|---|
| 2015/0242198 | A1* | 8/2015 | Tobolski | G06F 8/61 |
| | | | | 717/172 |
| 2015/0339114 | A1* | 11/2015 | Rockwell | G06F 8/65 |
| | | | | 701/1 |
| 2016/0025370 | A1* | 1/2016 | Sugimura | G06F 8/65 |
| | | | | 165/200 |
| 2016/0170775 | A1* | 6/2016 | Rockwell | G06F 8/65 |
| | | | | 713/100 |
| 2016/0350100 | A1* | 12/2016 | Folske | G06F 8/665 |
| 2017/0060559 | A1* | 3/2017 | Ye | G06F 8/65 |
| 2017/0090907 | A1* | 3/2017 | Kurosawa | G06F 8/654 |
| 2017/0123782 | A1* | 5/2017 | Choi | G06F 8/65 |
| 2017/0123784 | A1* | 5/2017 | Zymeri | H04L 41/082 |
| 2017/0228236 | A1* | 8/2017 | Nakahara | G05D 1/0088 |
| 2017/0242678 | A1* | 8/2017 | Sangameswaran | G06F 8/65 |
| 2017/0242679 | A1* | 8/2017 | Sangameswaran | G06F 8/65 |
| 2017/0242801 | A1* | 8/2017 | Sangameswaran | |
| | | | | G06F 11/1433 |
| 2017/0329599 | A1* | 11/2017 | Choi | G06F 8/65 |
| 2018/0024826 | A1* | 1/2018 | Caushi | G06F 8/65 |
| | | | | 717/172 |
| 2018/0189049 | A1* | 7/2018 | Madrid | G06F 8/65 |
| 2018/0191866 | A1* | 7/2018 | Nakahara | B60R 16/0231 |

OTHER PUBLICATIONS

M. Wahler and M. Oriol, "Disruption-free software updates in automation systems," Proceedings of the 2014 IEEE Emerging Technology and Factory Automation (ETFA), Barcelona, 2014, pp. 1-8. (Year: 2014).*

* cited by examiner

METHOD AND APPARATUS FOR MULTI CYCLE VEHICLE SOFTWARE UPDATE COMPLIANCE HANDLING

TECHNICAL FIELD

The illustrative embodiments generally relate to a method and apparatus for multi-cycle vehicle software update compliance handling.

BACKGROUND

Vehicle manufacturers have begun to include a multitude of computer microprocessors into modern vehicle models. From large scale operating systems controlling infotainment and telematics onboard the vehicle, to small system controls such as windows or a digital odometer, a vast array of software resides on memories associated with these microprocessors. Because of the connected nature of the vehicle computing systems, and the fact that the systems both interact with each other and share a data pipeline called the vehicle bus, there is a constant concern about whether the software on one system will work with software on other modules.

The vehicle bus is a shared data pipe that is subject to manipulation from every connected module. Since modules in a controller area network (CAN) system using a vehicle bus all multi-cast data onto the bus, there is a possibility that malfunctioning or improper software can negatively affect data broadcast by other modules over the bus. At the same time, there is increased demand from consumers that their vehicles have the most updated and fully integrated software available. This combination results in pressure on original equipment manufacturers (OEMs) to provide both robust and constant software updates.

This paradigm might be more manageable if all the software used a central processing unit and a unified operating system, but since there are tens or even hundreds of electronic control units (ECUs) each running their own software, and each having potential dependencies on other ECUs, updating the software of just a single ECU can cause massive issues on a vehicle network, if not done with care and consideration.

Over the air (OTA) updates have become increasingly popular as a method for updating vehicle software. A vehicle downloads an update when an internet or other remote connection is available, and then, when the vehicle has an appropriate opportunity, the vehicle processes the update. Originally most OTA updates were done while a vehicle was in a parked state, but new models have provided better methods for performing OTA updates while a vehicle is being driven. In either event, the vehicle may take several cycles to complete the update, which typically must be fully completed, and verified, before being used, due to potential impact on a driving situation.

The older method of updating software was to take a vehicle to a dealer and have the dealer install the newest versions of any needed updates. While this model still is heavily in use, OTA updates have the obvious advantage of occurring in the background, without any explicit action by the customer. An issue can occur, however, if the customer drives the vehicle to a dealer and has parts or software updates, replaced or modified. In this instance, if a previous update is still processing, and the dealer attempts to install updated software on the same or a related module, compatibility problems may arise.

SUMMARY

In a first illustrative embodiment, a system includes a processor configured to query one or more vehicle electronic control unit (ECU) modules to determine current software versions installed on the ECU modules, responsive to a multi-cycle update process resuming. The processor is also configured to pause the update process, responsive to the query identifying a change in at least one software version to a different version from when the update process first began. The processor is additionally configured to report the change to a remote source.

In a second illustrative embodiment, a system includes a processor configured to receive a plurality of electronic control unit (ECU) module software version identifiers from a vehicle. The processor is also configured to determine that a new software version is available for at least one ECU module based on the identifiers. The processor is further configured to determine compatibility of the new software version with the received ECU module software versions identified by the identifiers and instruct the vehicle to update the at least one ECU module to the new software version responsive to determining the new software version is compatible.

In a third illustrative embodiment, a computer-implemented method includes querying to obtain electronic control unit (ECU) module software versions, responsive to a determination that a multi-cycle software update is attempting to resume. The method also includes sending a list of changed ECU module software versions to a remote source, and preventing resumption of the multi-cycle software update, responsive to a determination from the query that an ECU module software version has changed. The method further includes resuming the multi-cycle update, incorporating any changes received from the remote source, responsive to receiving instructions from the remote source to resume the update.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
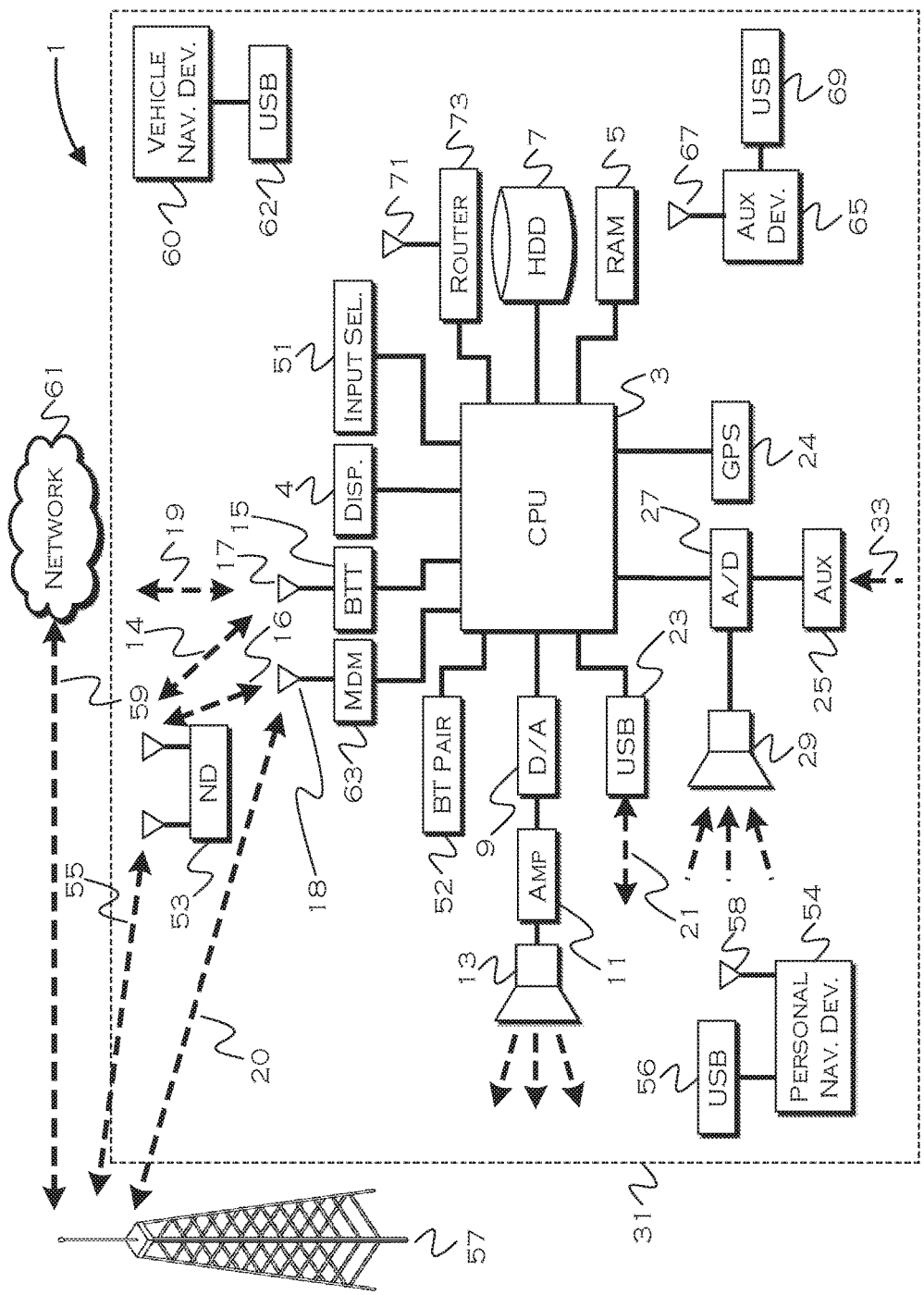
FIG. 1 illustrates a representative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis. While SYNC provides one example of a vehicle based computing system, it may be more useful to think of the vehicle computing system as one or more electronic control units, each of which may be assigned a different task. This can include, for example, a telematics control unit (TCU), connectivity modules, gateway modules and a whole variety of other tasked and retaskable micro-processing units installed within the vehicle.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs of the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WI-FI access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WI-FI and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WI-FI) or a WiMax network.

In one embodiment, incoming data can be passed through the nomadic device via a data-over-voice or data plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but is not limited to, personal media players, wireless health devices, portable computers, and the like.

Also, or alternatively, the CPU could be connected to a vehicle based wireless router 73, using for example a WI-FI (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While the illustrative examples shown are discussed with respect to a multi-drive-cycle update, the same concept can occur for any multi-cycle (e.g., multi-off-cycle, etc.) update where a previous update is still only partially processed at a time when another source (e.g., user, dealer, etc.) attempts an update of the in-process module or a related module.

The illustrative embodiments propose a process that allows the telematics control unit (TCU), which, in these examples, handles the OTA updates, to query all modules being updated at an ignition-on event. Other trigger points (other than ignition-on) would be appropriate if other update paradigms were used (e.g., using ignition-off event for query trigger if ignition-off cycles were used for updates). If any parameters on modules queried have changed, for example, if another process, such as a dealer, has updated a module, the TCU may pause all updates and report the changes to the cloud. The cloud can then verify that no conflicts will exist with continuing the update. If conflicts exist, the TCU may simply cease the update and/or receive a new update module that is compatible with the current configuration determined by the query.

It is worth noting that the TCU query may encompass modules that relate to modules being updated, even if those related modules are not currently undergoing updates, because the modules undergoing updates may have some reliance on or necessary compatibility with the related modules.

The TCU is also capable, in some instances, of determining how to proceed without contacting the cloud. For example, the TCU could be provided with an updateable compatibility list, so that, for example, if a dealer updated a module, the TCU list would be updated with the compatibility versions for other modules that may rely on the dealer-updated module. In other instances, if changes are detected, but only to modules that are unrelated to ongoing updates, the TCU may elect to proceed, since compatibility should not be an issue.

Figure 2:
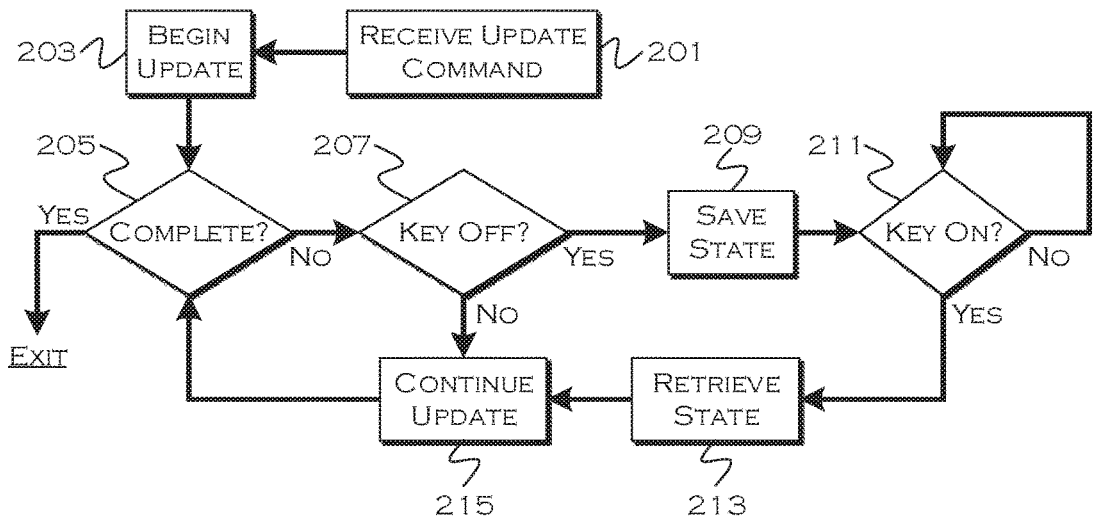
FIG. 2 illustrates an update process.

FIG. 2 illustrates an update process. In this illustrative example, the TCU receives an OTA update command from the cloud 201, indicating that the TCU should process an OTA update. Responsive to the command, the TCU begins the update 203 during a key-on cycle (the model used for this example).

If the update completes during the key-on cycle, the process can simply exit, since there are not likely any compatibility issues that arose during the key-on cycle (since the compatibility was presumably verified by the server on the cloud before the update was sent). If the process does not complete 205, the process will eventually detect a key-off 207 state, ending the update processing. As long as the process does not detect the key-off state, the update continues 215.

If the key-off state is detected, the updating ECUs and TCU save 209 any state data needed to continue the update at a next key-on cycle 211. Once the key-on state is detected 211, the process retrieves any saved state data 213 and the update continues 215. This illustrative process shows the update model as it currently exists, without verification of module changes during the key-off state. This update model is subject to the potential issues described herein, namely, that a module on which an updating module relies is changed during the key-off state, and the updating module completes the update, and the TCU is then presented with two potentially incompatible modules, despite the fact that both have just been updated.

Figure 3:
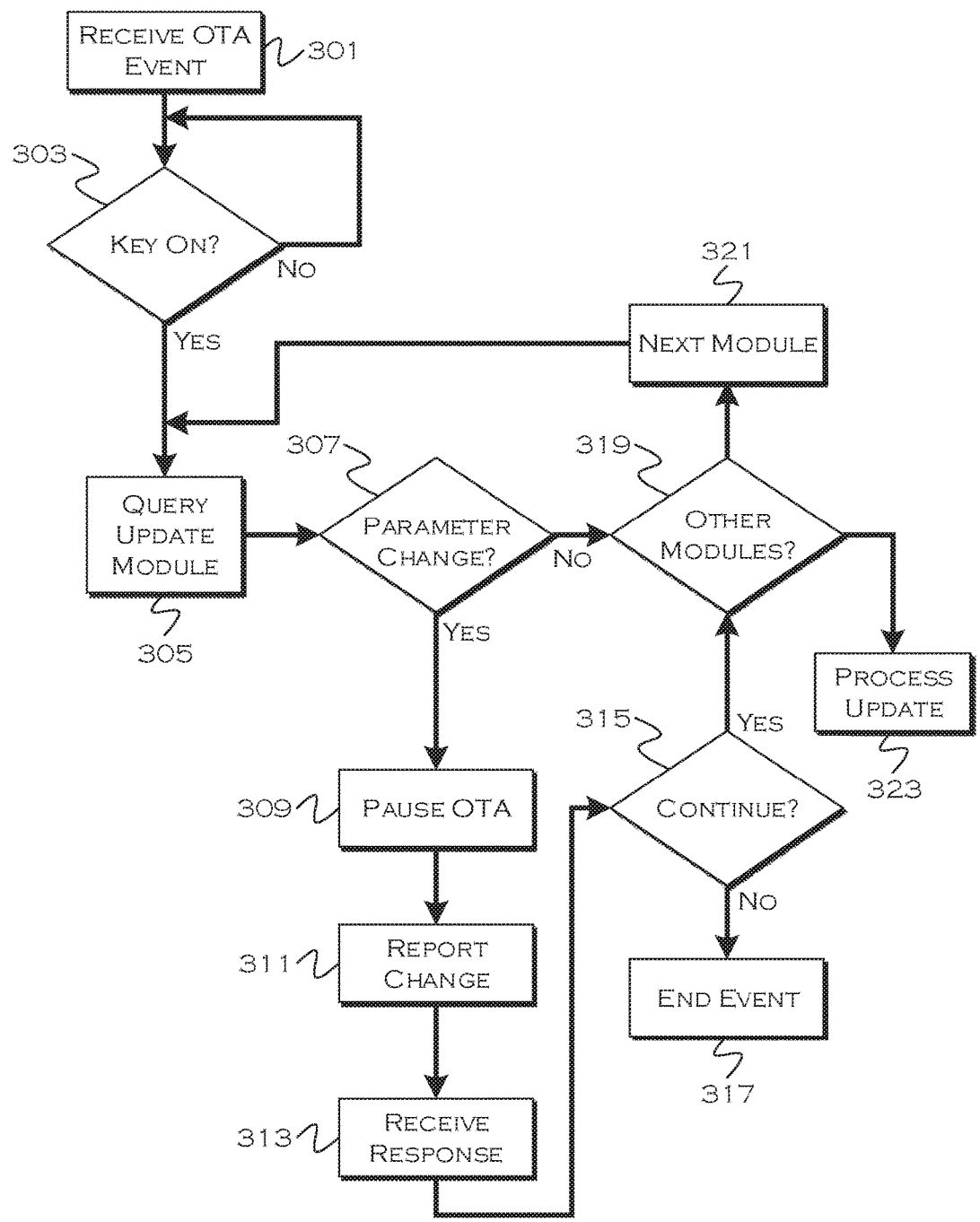
FIG. 3 illustrates a verification process for OTA update processing.

FIG. 3 illustrates a verification process for OTA update processing. In this illustrative example, the process receives an OTA update event from a remote source 301. Again, the process delays the OTA update until the process detects a key-on state 303.

Once the process detects a key-on state 303, the process queries an update module 305 (a module being updated) to see if there were any changes to the updating module 307 made during the key-off state. For example, a dealer could have completely overwritten the software installed on the updating module, making the ongoing update unnecessary. But, even in this instance, the dealer may have updated the module with a wrong version (for compatibility's sake) or older software version than currently exists. Accordingly, the process pauses the ongoing update 309.

The process then reports the detected change back to the cloud 311, and receives a response 313 from the cloud, instructing the process as to how to proceed. The pause and reporting is shown in a sequential fashion in this example, but it is reasonable that all data can/will be gathered before the report and response is made.

In addition to determining if the parameters of the updating module have changed, the process may also determine if there are other modules that need to be checked for software changes 319. This could be a determination with respect to all modules on the vehicle, or only with respect to modules having a known working relationship with an updating module. If modules remain for querying, the process will move to a next module 321 and repeat the query process for each relevant module.

Once no modules remain for updates, and the process has received an instruction to continue 315 from the cloud, to the extent that the process detected and reported any changed modules, the process may continue with the update for the current key-on cycle 323.

If the cloud instructed the process not to continue 315, the process may cease updating identified modules 317. If the process did not detect any changes to any relevant modules, the process may determine that continuing is permissible without explicit instruction from the cloud.

The following illustrative scenario shows an example of two modules, ECU1 and ECU2, which both have varied possible software configurations. In this example, ECU1 is OTA updateable and ECU2 is not OTA updateable. This means that direct interface will be needed to update ECU2, by an owner, a dealer, etc. In this example, ECU1 executes software version C, and ECU2 executes software version 3, and a customer would prefer to have the latest and compatible versions installed in each module. ECU1 and ECU2 have some cross-compatibility requirements, such that ECU2 versions 1-3 are compatible with ECU1 versions A-F, but ECU2 versions 4-9 are only compatible with ECU1 versions A-D and G-H (exempting E and F, and adding G and H). This means that ECU2 version 4 and ECU1 version E would present an incompatibility issue.

Figure 4:
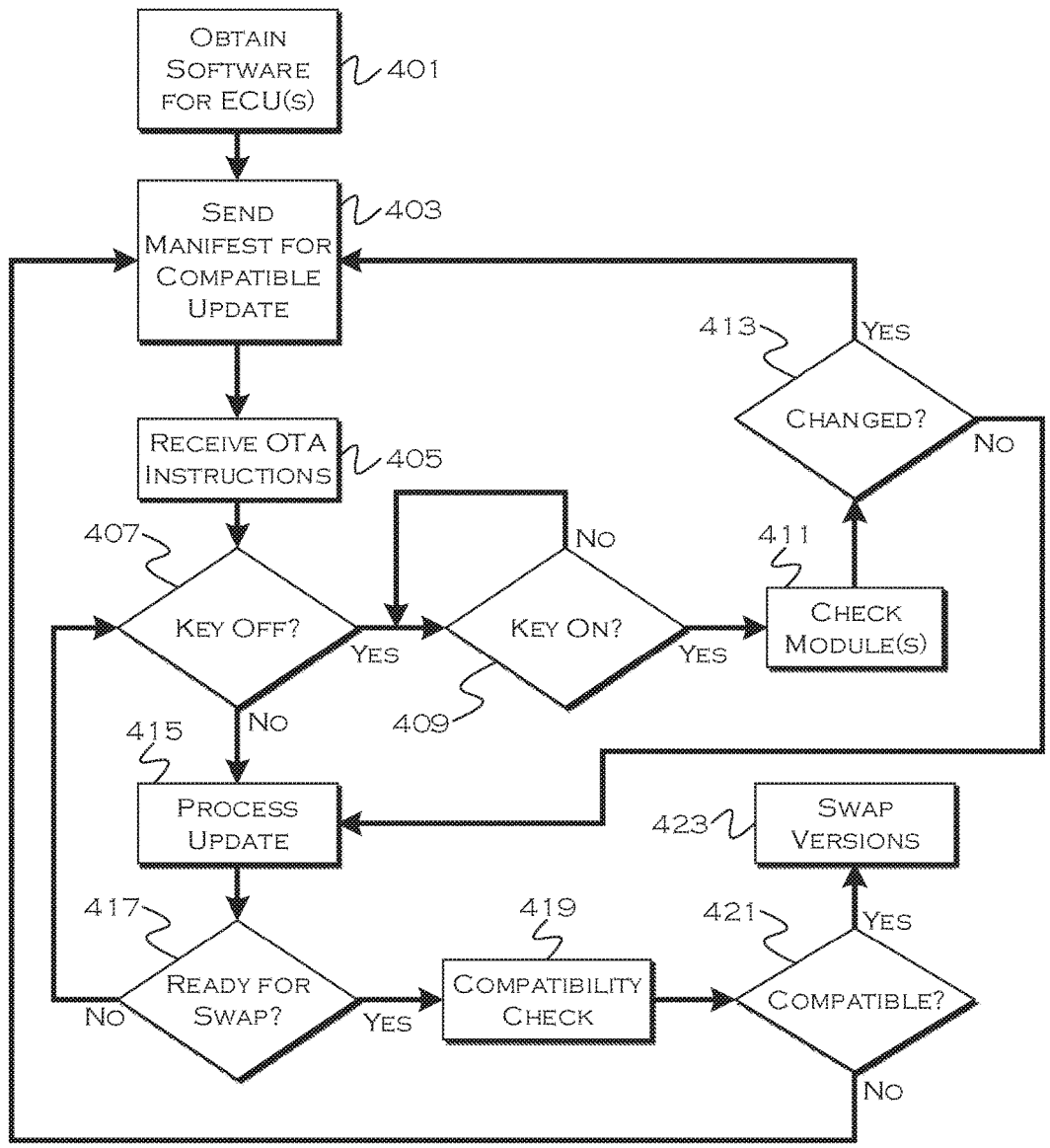
FIG. 4 illustrates a second update processing and compatibility check process.

This example will be described with respect to FIG. 4, which illustrates a second update processing and compatibility check process. In this example, the TCU first obtains the current configuration 401 of the modules ECU1 and ECU2 (C and 3, respectively). The TCU sends a list of the software versions of the various modules to the cloud 403, and responsively receives OTA update instructions 405. In this example, since only ECU1 is OTA updateable, the cloud sends instructions to update ECU1 to the latest version that is also compatible with the ECU2 version 3. In this case, those instructions are for the TCU to update ECU1 to version F.

In this example, the vehicle is also running, so the update can begin immediately, assuming that the key has not been turned off 407. The update is processed 415, and once ECU1 has completed processing, ECU1 will swap to the newly installed version F. If the system is ready for a swap to the new software 417, a final compatibility check may be made 419. If the swap is not ready 417, then the update is still processing and will continue to do so until the process detects a key-off state or the update completes.

The last compatibility check ensures that the now-installed software is still compatible with any other modules according to defined compatibility. If the installed software is still compatible 421, the process will swap to the new version of the software on ECU1 and utilize that software (version F) for ECU1. If there has been a last minute change, for example, ECU2 switching to version 9, and version F is no longer compatible, then the process can send a new version manifest to the cloud so that the cloud can determine which software should actually be installed on ECU1 (in this case, version H, which is the newest software and also compatible with the now version 4 on ECU2).

During the update process, if a key-off occurs, the process will pause the update until the process detects a key-on state 409. Once a key-on state is detected during a paused update process, the process checks the present module (which will still be updating, in this example) and any associated modules, such as ECU2.

In this example, the customer drove to a dealership and the key-off occurred at the dealership. Attempting to meet the customer demands, the dealer installed ECU2 version 9, which is the most recent ECU2 version and is also compatible with version C on ECU1, since ECU1 was still executing version C (having not completed the update to version D). So, from the dealer perspective, all compatibility checks were met and the customer now has version C on ECU1 and version 9 on ECU2.

Upon the next key-on 409 state, the process detects that module ECU2 has changed 413 to version 9. Since this may present a compatibility issue (and in this case, it does), the process pauses the update and reports the change back to the cloud 403. The cloud can then determine that the update to version D on ECU should cease, as D and 9 are incompatible, and instead can instruct an update to version H, which is both the most recent version for ECU1 and is compatible with version 9.

The cloud, in this example, could not have immediately instructed updating to version H initially, because H and version 3 (on ECU2) are incompatible. The best the cloud could have done was to instruct an update to version F. Updating to version F, however, would have presented the same problem once ECU2 was updated to any of versions 4-9, as none of those versions are compatible with version F.

This example demonstrates the complexity of successfully updating a system with a wide variety of independent and interdependent ECUs. Since certain ECUs may be updated while another ECU update is ongoing but offline, conflicts are almost sure to arise. Through the illustrative examples presented, compatibility checks help ensure that the system maintains integrity as both OTA and other-source updates are ongoing.

Figure 5:
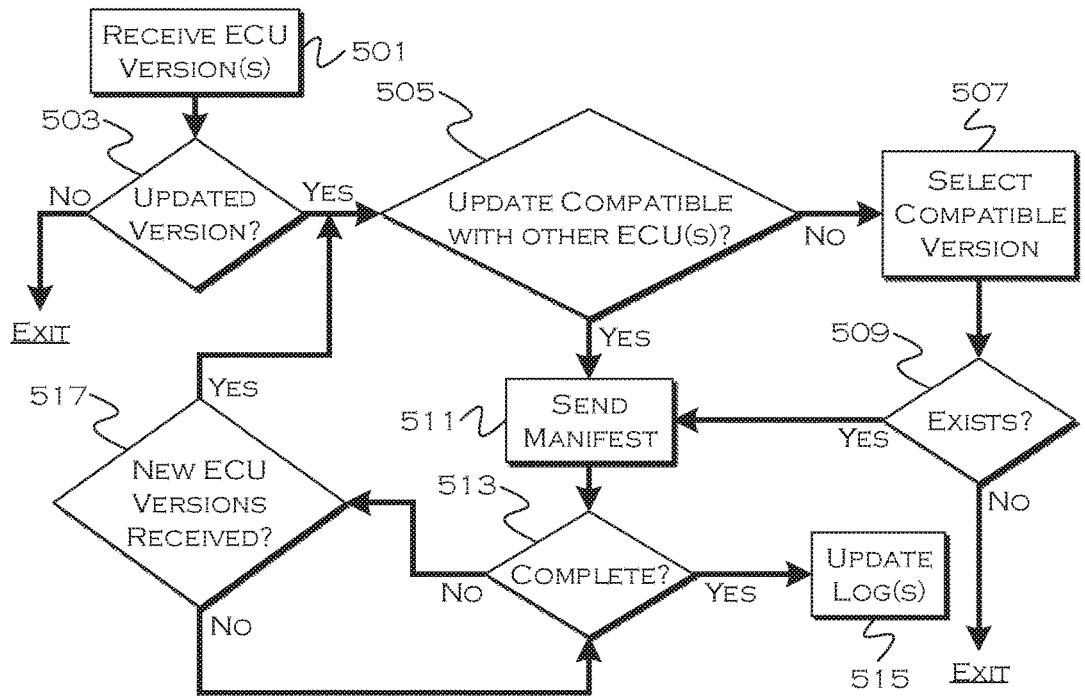
FIG. 5 illustrates a module compatibility check process.

FIG. 5 illustrates a module compatibility check process that can occur in the cloud, for example, or wherever the update manifest is assembled. In this illustrative example, the process receives ECU software/firmware versions for any relevant modules (up to, and including, all modules that are both OTA and non-OTA updateable). Receiving the module version data for non-OTA updateable modules may still matter, because compatibility of new OTA update versions may rely somewhat on the non-OTA updateable modules.

In this example, the process determines, for any OTA updateable ECU module version received, whether or not there is an updated version of software available 503 for that particular module. If there is an updated version 503, the process then performs a compatibility check.

The process may select a newest version (and work backwards until compatibility is found) or may select a newest version known to be compatible with at least one other module 507. In the initial selection, a quick database sort using the received module versions can ensure compatibility 505 of the initial selection.

The process assembles and sends a manifest 511 to the TCU, which includes instructions and/or data for processing the update. The TCU processes the update over possibly multiple key cycles, reporting back to the cloud if any changes to the initial ECU configuration are detected by the TCU.

If the TCU has not reported the update as being completed 513, and instead has sent a new set of ECU versions 517 indicating a change to one or more ECU software versions, the process again checks to see if the currently instructed (and ongoing but paused) update is compatible with the new versions 505.

If the update is compatible, the process can resend the initial manifest or simply send an instruction for the TCU to continue update processing. If the previously instructed update is now incompatible (as was the case in the preceding example), the process can select another compatible version that is compatible with the existing configuration 507.

If no new version exists, that is, if the most-recent compatible version is already installed on the ECU being updated, the process can exit (and possible send a cease-update instruction). If a newer (newer than currently installed) version that is also compatible exists 509, the process can send a new manifest, instructing the TCU to change the update to the newest compatible version identified by the process.

The illustrative embodiments present a compatibility check than can result in the changing of update instructions multiple times for a single module before an update is completed for that module. Even so, the compatibility check helps avoid customer issues and ensures system integrity, while at the same time allowing the customer to enjoy the most recent compatible versions of software available for at least the OTA updateable modules on the vehicle, in an ongoing manner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
    a processor configured to:
    responsive to a multi-cycle vehicle-software update process resuming, query one or more vehicle electronic control unit (ECU) modules to determine current software versions installed on the ECU modules;
    responsive to the query identifying a change in at least one software version to a different version from when the update process first began, pause the update process; and
    report the change to a remote source.

2. The system of claim 1, wherein the multi-cycle update process resuming follows a change in ignition state.

3. The system of claim 1, wherein the processor is configured to query at least ECU modules being changed by the multi-cycle update process.

4. The system of claim 1, wherein the processor is configured to query at least ECU modules having a pre-defined compatibility requirement with ECU modules being changed by the multi-cycle update process.

5. The system of claim 1, wherein the processor is configured to query all ECU modules.

6. The system of claim 1, wherein the processor is included in a telematics control unit (TCU).

7. The system of claim 1, wherein the processor is configured to:
    receive instructions from the remote source for a change in the multi-cycle update process, responsive to the query further identifying a new software version for installation on at least one of the ECU modules previously being modified by the multi-cycle update process;
    modify the multi-cycle update process to incorporate the change; and
    resume the modified multi-cycle update process responsive to the instructions.

8. The system of claim 1, wherein the processor is configured to:
    receive instructions from the remote source to resume the multi-cycle update process unchanged responsive to the reporting; and
    resume the multi-cycle update process responsive to the instructions.

9. A computer-implemented method comprising:
    querying to obtain electronic control unit (ECU) module software versions, responsive to a determination that a multi-cycle software update is attempting to resume;
    sending a list of changed ECU module software versions to a remote source, and preventing resumption of the multi-cycle software update, responsive to a determination from the query that an ECU module software version has changed; and
    resuming the multi-cycle update, incorporating any changes received from the remote source, responsive to receiving instructions from the remote source to resume the update.

10. The system of claim 9, wherein the changes include changes to a software version previously being installed by the multi-cycle update.

11. The system of claim 9, wherein the remote source includes an original equipment manufacturer server.

12. The system of claim 9, wherein the determination that the multi-cycle software update is attempting to resume is based on detecting a change in ignition state.

* * * * *